United States Patent [19]

Steiner

[11] Patent Number: 4,811,992

[45] Date of Patent: Mar. 14, 1989

[54] WHEEL-MOUNTING ARRANGEMENT WITH EMERGENCY BEARING SURFACE

[75] Inventor: Helmut Steiner, Wiehl, Fed. Rep. of Germany

[73] Assignee: Bergische Achsenfabrik Fr. Kotz & Söhne, Wiehl, Fed. Rep. of Germany

[21] Appl. No.: 128,993

[22] Filed: Dec. 4, 1987

[30] Foreign Application Priority Data

Dec. 17, 1986 [DE] Fed. Rep. of Germany ....... 3643081

[51] Int. Cl.⁴ ...................... B60B 27/00; F16C 21/00
[52] U.S. Cl. .................................... 301/105 R; 301/1; 301/124 R; 384/102; 384/128
[58] Field of Search ............... 301/1, 6 R, 124 R, 126, 301/131, 109, 110, 105 R, 130; 384/101, 102, 126, 127, 128, 624

[56] References Cited

U.S. PATENT DOCUMENTS

| | | | |
|---|---|---|---|
| 2,961,073 | 11/1960 | Legge et al. | 301/6 R X |
| 3,721,161 | 3/1973 | Bobst | 384/128 X |
| 3,913,992 | 10/1975 | Scott et al. | 384/465 |
| 4,331,210 | 5/1982 | Petrak | 301/131 X |
| 4,394,091 | 7/1983 | Klomp | 384/102 X |
| 4,641,978 | 2/1987 | Kapich | 384/102 |

FOREIGN PATENT DOCUMENTS

| | | |
|---|---|---|
| 551349 | 6/1932 | Fed. Rep. of Germany . |
| 1893835 | 12/1963 | Fed. Rep. of Germany . |
| 1933914 | 7/1968 | Fed. Rep. of Germany . |
| 316313 | 11/1956 | Switzerland . |

Primary Examiner—Robert B. Reeves
Assistant Examiner—Russell D. Stormer
Attorney, Agent, or Firm—Becker & Becker, Inc.

[57] ABSTRACT

A wheel-mounting arrangement for trailer axles, including tapered-roller bearings that are disposed on an axle spindle, and a hub that is rotatably mounted on the axle spindle via these tapered-roller bearings. A brake drum and a wheel or TRILEX star can be secured to the hub, which comprises an inner hub and an outer hub that is fixedly secured to the inner hub. In order to provide the wheel-mounting arrangement with emergency operation characteristics, the axle spindle has a tapered configuration in the region between the tapered-roller bearings, and the inner hub has a corresponding, inwardly projecting, tapered configuration between these same roller bearings. The tapered portions of the axle spindle and the inner hub together form a friction or sliding bearing for emergency operation.

8 Claims, 4 Drawing Sheets

WHEEL-MOUNTING ARRANGEMENT WITH EMERGENCY BEARING SURFACE

BACKGROUND OF THE INVENTION

The present invention relates to a wheel-mounting arrangement for trailer axles, and includes tapered-roller bearings that are disposed on an axle spindle, and a hub that is rotatably mounted on the axle spindle via the roller bearings. A brake drum and a wheel or TRILEX star can be secured to the hub, which comprises an inner hub and an outer hub that is fixedly secured to the inner hub.

Various constructions of wheel-mounting arrangements having split hubs are known, for example from German Gebrauchsmuster No. 19 88 914 or Swiss Patent No. 316 313. The purpose of a split wheel hub is to be able to replace the brake linings in a drum brake, without having to open the hub mounting for this purpose. For this reason, the brake drum is also secured on the outer hub. However, the heretofore known wheel-mounting arrangements that have a split hub are not provided with any emergency operation characteristics when one of the two tapered-roller bearings becomes damaged.

German Offenlegungsschrift No. 23 19 264 discloses a wheel-mounting arrangement having a one-piece hub that is mounted on an axle spindle via ball bearings. In the region between the ball bearings the inner wall of the wheel hub follows the course of the axle spindle, although it is spaced therefrom. Since the central portion of the wheel hub between the two ball bearings serves no useful purpose, it can extend either linearly or convexly relative to the axle spindle. This known wheel-mounting arrangement does not have any emergency operation characteristics either.

Proceeding from the above, it is an object of the present invention to provide a wheel-mounting arrangement that has a straightforward construction, a split hub, and emergency operation characteristics.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
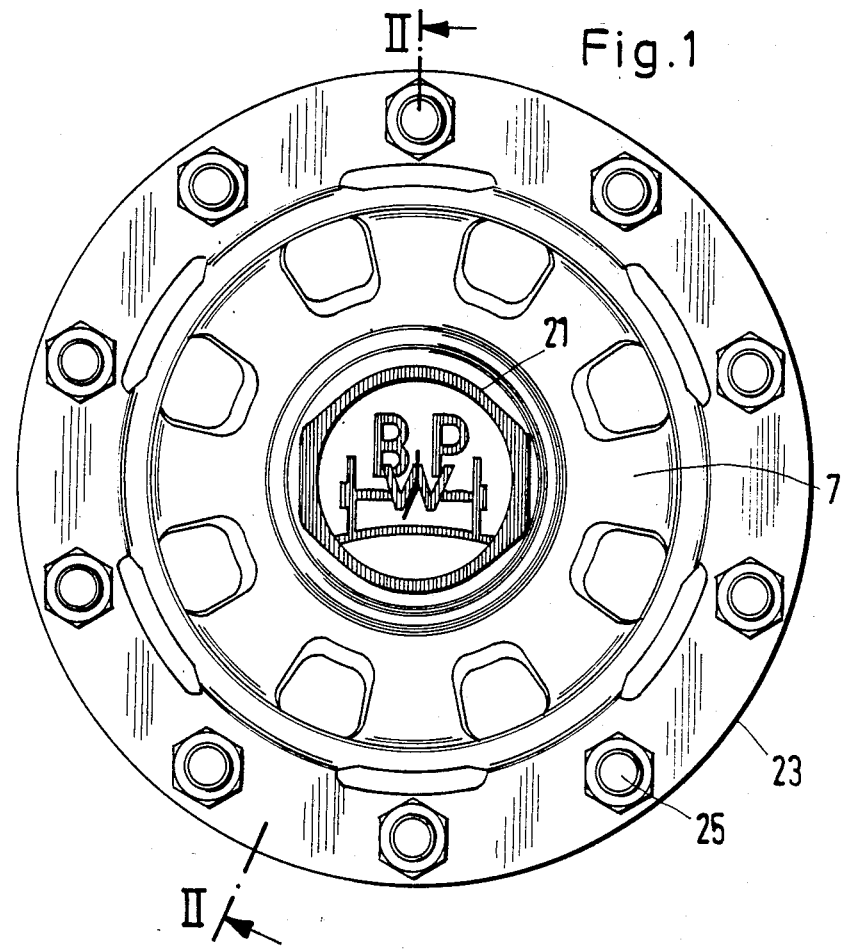
FIG. 1 is an end view of one exemplary embodiment of the inventive wheel-mounting arrangement in a closed state.

The wheel-mounting arrangement of the present invention is characterized primarily in that the axle spindle has a tapered configuration in the region between the tapered-roller bearings, and the inner hub has a corresponding, inwardly projecting, tapered configuration between these same tapered-roller bearings, with the tapered portions of the axle spindle and the inner hub together forming a friction or sliding bearing for emergency operation.

Pursuant to one preferred embodiment of the inventive construction, lubricant chambers that communicate with one another via at least one channel are provided at both ends of the inner hub in order to assure supply of lubricant to the two tapered-roller bearings, and in the case of an emergency operation, of course also to the friction or sliding bearing.

Pursuant to one practical specific embodiment of the present invention, it is furthermore possible to fixedly press the outer hub onto the inner hub in the region of the tapered-roller bearings via tapered seats. In addition, the fixed connection between the outer hub and the inner hub can consist of a tooth or key construction that is disposed between the tapered seats and is formed by two cams or dogs that are formed on the inner hub, as well as by stops that are formed on the outer hub and cooperate with the cams or dogs.

The wheel-mounting arrangement of the present invention has the advantage that it requires very little maintenance because the drum brake can be exposed by pulling off the outer hub, on which are secured the wheel and the brake drum, without thereby having to also open the wheel-mounting arrangement. At the same time, the inventive wheel-mounting arrangement also has what for traffic safety is an invaluable advantage, namely that it provides an emergency operation mounting arrangement between the axle spindle and the hub if one of the two tapered-roller bearings becomes damaged or even breaks. In the case of an emergency operation, the hub can be supported against the axle nuts that ar screwed onto the axle spindle via the inner taper of the inner hub and the outer tapered-roller bearing.

A further advantage of the inventive wheel-mounting arrangement is that either the outer hub and the brake drum, or the outer hub and the TRILEX star or a rim, can be embodied as a single piece and can be made of the same material. This eliminates a detachable connection between two important structural components, thereby improving the statics of the wheel-mounting arrangement.

Further specific features of the present invention will be described in detail subsequently.

DESCRIPTION OF PREFERRED EMBODIMENTS

Referring now to the drawings in detail, an axle spindle 2 is secured or formed onto the end of an axle body 1. The spindle 2 is provided with two spaced-apart bearing seats 3, 4 for an inner tapered-roller bearing 5 and an outer tapered-roller bearing 6. Between the two roller bearings 5, 6, the axle spindle 2 has a tapered or conical configuration.

Rotatably disposed on the two tapered-roller bearings 5, 6 is an inner hub 7 that in the region between the two roller bearings 5, 6 has an inside taper that projects inwardly and conforms to the taper of the axle spindle 2. This inside taper and the spindle 2 together form a friction or sliding bearing that has emergency operation characteristics.

The two tapered-roller bearings 5, 6 are fixed in position on the bearing seats 3, 4 via an inwardly disposed thrust ring 9, the inner hub 7, and axle nuts 10, 11 that are screwed onto the outer surface of the spindle 2 and have a lock washer disposed between them. The inner and outer sides of the wheel-mounting arrangement are sealed off via sealing members 12, 13.

Figure 3:
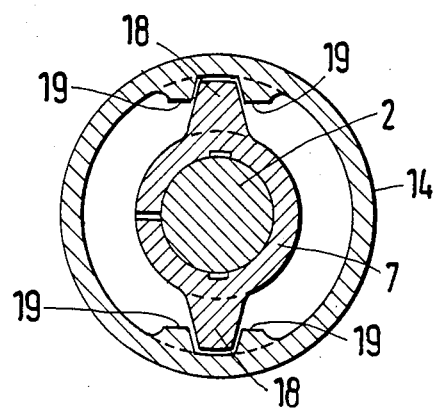
FIG. 3 is a cross-sectional view of the inventive wheel-mounting arrangement taken along the line III—III in FIG. 2.
Figure 2:
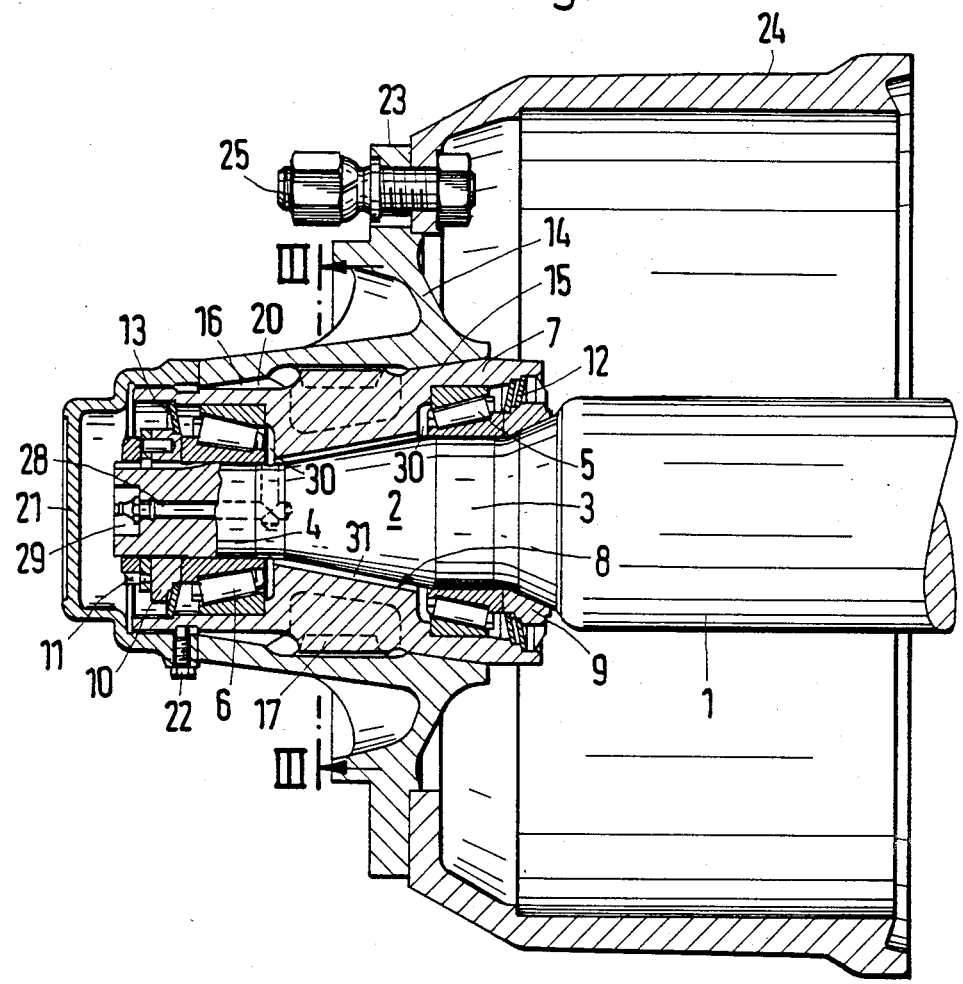
FIG. 2 is a cross-sectional view of the wheel-mounting arrangement of FIG. 1 taken along the line II—II in FIG. 1, with the individual components of the drum brake being omitted.

In the embodiment illustrated in FIGS. 1 to 3, an outer hub 14 is placed upon the inner hub 7 and is fixed in its position via tapered seats 15, 16. A tooth or key construction 17 is disposed between the inner hub 7 and the outer hub 14. As shown in the cross-sectional view of FIG. 3, this key construction comprises cams or dogs 18 formed on the inner hub 7, and stops 19 formed on the outer hub 14. So that during assembly the stops 19 can be moved over the inner hub 7, assembly recesses 20 are provided in the outer tapered seat 16.

The outer hub 14 that is placed on the inner hub 7 is held securely in its position on the one hand by the frictional resistance in the tapered seats 15, 16, and on the other hand additionally via a hub cap 21 that is screwed onto the inner hub 7. The cap 21 is additionally secured to the inner hub 7 via a locking screw 22.

In the embodiment illustrated in FIG. 2, the outer hub 14 is provided with a securing flange 23, on the inner side of which can be secured a brake drum 24, and on the outer side of which, via wheel bolts 25, can be secured a non-illustrated wheel.

Figure 4:
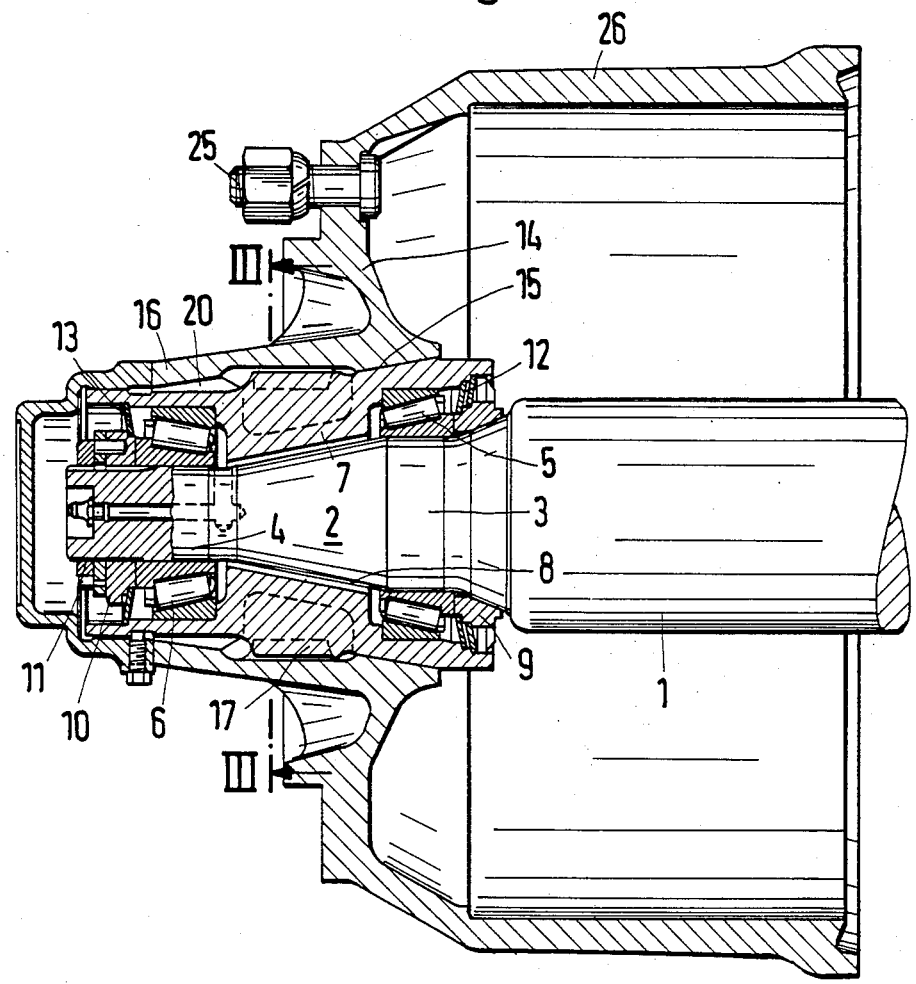
FIG. 4 is a cross-sectional view of another exemplary embodiment of the inventive wheel-mounting arrangement, with the outer hub and brake drum being embodied as a single piece.

In the embodiment illustrated in FIG. 4, the outer hub 14 and the brake drum 24 are constructed as a one-piece drum hub 26. A non-illustrated wheel can again be secured via wheel bolts 25 to this drum hub 26.

Figure 5:
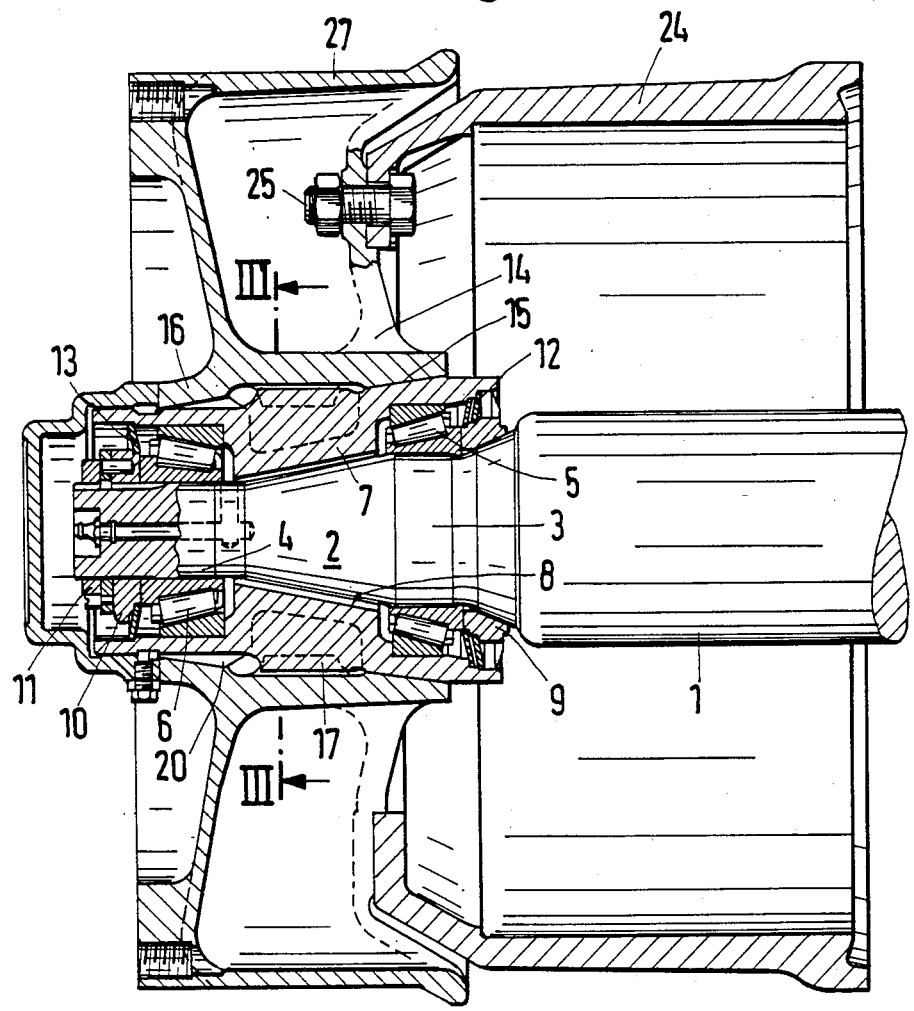
FIG. 5 is a cross-sectional view through a further exemplary embodiment of the inventive wheel-mounting arrangement, with the outer hub and TRILEX star being embodied as a single piece.

In the embodiment illustrated in FIG. 5, the outer hub 14 is integrally embodied as a TRILEX hub 27. A brake drum 24 can again be secured via wheel bolts 25 to this hub 27.

It would also be possible to construct the outer hub 14 and a wheel rim in one piece to form a rim hub.

A lubricating channel 28 having an outwardly disposed fitting 29 is provided in the axle spindle 2 for lubricating the two tapered-roller bearings 5, 6. In order to assure a good distribution of lubricant, lubricant chambers 30 are provided at both ends of the inner hub 7. These lubricant chambers 30 communicate with one another via channels 31 that are provided in the friction or sliding surface.

If the drum brake must be opened to check the brakes or to replace the brake linings, the hub cap 21 is opened, and thereafter the outer hub 14, including the wheel and brake drum, are withdrawn from the inner hub 7. In so doing, the hub mounting remains in tact. It is therefore not necessary to again clean and relubricate the hub mounting after the above-mentioned servicing is complete. In the realistic practice of transport operations, this assembly technique leads to a significant facilitation of assembly, and at the same time also constitutes a contribution toward traffic safety.

If the tapered-roller bearings 5, 6 break or become damaged, the friction or sliding bearing 8 takes over the emergency operation. In this connection, the inner hub 7 is supported on the axle spindle 2 via the tapered-roller bearing 6, i.e. the inner ring thereof, and the axle nuts 10, 11.

The present invention is, of course, in no way restricted to the specific disclosure of the specification and drawings, but also encompasses any modifications within the scope of the appended claims.

What I claim is:

1. In a wheel-mounting arrangement for trailer axles, including tapered-roller bearings that are disposed on an axle spindle, and a hub that is rotatably mounted on said spindle via said roller bearings, whereby a brake drum and a wheel or TRILEX star can be secured to said hub, which comprises an inner hub and an outer hub that is fixedly secured to said inner hub, the improvement wherein:
    said axle spindle has a tapered configuration in the region between said tapered-roller bearings, and said inner hub has a corresponding, inwardly projecting, tapered configuration between said roller bearings, with said tapered portions of said axle spindle and said inner hub together forming a sliding bearing for emergency operation in the event that said roller bearings become damaged.

2. A wheel-mounting arrangement according to claim 1, in which said tapered portion of said inner hub has two ends, both of which are provided with lubricant chambers that communicate with one another via at least one channel.

3. A wheel-mounting arrangement according to claim 1 in which said outer hub is provided with tapered seats in the regions of said tapered-roller bearings, with said tapered seats permitting said outer hub to be fixedly pressed onto said inner hub.

4. A wheel-mounting arrangement according to claim 3, in which said fixed connection between said inner and outer hubs is effected by a key construction that is provided in the region between said tapered seats.

5. A wheel-mounting arrangement according to claim 4, in which said key construction comprises two dogs that are formed on said inner hub, and stops that are provided on said outer hub and cooperate with said dogs.

6. A wheel-mounting arrangement according to claim 1, in which said outer hub and a brake drum are embodied as a single part and form a drum hub.

7. A wheel-mounting arrangement according to claim 1, in which said outer hub and a TRILEX star are embodied as a single part and form a TRILEX hub.

8. A wheel-mounting arrangement according to claim 1, in which said outer hub and a wheel rim are embodied as a single part and form a rim hub.

* * * * *